(12) United States Patent
Al-Muntasheri et al.

(10) Patent No.: US 9,862,878 B2
(45) Date of Patent: Jan. 9, 2018

(54) HIGH TEMPERATURE FRACTURING FLUIDS WITH NANO-CROSSLINKERS

(71) Applicant: Aramco Services Company, Houston, TX (US)

(72) Inventors: Ghaithan Al-Muntasheri, Houston, TX (US); Feng Liang, Cypress, TX (US); Hooisweng Ow, Woburn, MA (US); Jason Cox, Ashland, MA (US); Martin E. Poitzsch, Derry, NH (US)

(73) Assignee: SAUDI ARABIAN OIL COMPANY (SA)

( * ) Notice: Subject to any disclaimer, the term of this patent is extended or adjusted under 35 U.S.C. 154(b) by 57 days.

(21) Appl. No.: 14/963,966

(22) Filed: Dec. 9, 2015

(65) Prior Publication Data

US 2016/0168449 A1 Jun. 16, 2016

Related U.S. Application Data

(60) Provisional application No. 62/090,635, filed on Dec. 11, 2014.

(51) Int. Cl.
| | |
|---|---|
| *E21B 43/267* | (2006.01) |
| *C09K 8/80* | (2006.01) |
| *C09K 8/68* | (2006.01) |
| *C09K 8/88* | (2006.01) |
| *C09K 8/92* | (2006.01) |
| *E21B 43/26* | (2006.01) |

(52) U.S. Cl.
CPC ............ *C09K 8/685* (2013.01); *C09K 8/80* (2013.01); *C09K 8/88* (2013.01); *C09K 8/882* (2013.01); *C09K 8/885* (2013.01); *C09K 8/887* (2013.01); *C09K 8/92* (2013.01); *E21B 43/26* (2013.01); *E21B 43/267* (2013.01); *C09K 2208/10* (2013.01)

(58) Field of Classification Search
CPC ...... C09K 2208/10; C09K 8/80; C09K 8/685; C09K 8/805; C09K 8/62; E21B 43/267; E21B 43/26; E21B 43/25
See application file for complete search history.

(56) References Cited

U.S. PATENT DOCUMENTS

| | | | |
|---|---|---|---|
| 5,208,216 A | 5/1993 | Williamson et al. | |
| 6,011,075 A | 1/2000 | Parris et al. | |
| 7,644,764 B2 | 1/2010 | Berkland et al. | |
| 7,721,803 B2 | 5/2010 | Huang et al. | |
| 2007/0161515 A1* | 7/2007 | Bicerano | C09K 8/68 507/117 |
| 2007/0166748 A1 | 7/2007 | Ren-Hua Jin et al. | |
| 2008/0058229 A1 | 3/2008 | Berkland et al. | |
| 2008/0223578 A1 | 9/2008 | Berkland et al. | |
| 2009/0114390 A1 | 5/2009 | You | |
| 2011/0146974 A1 | 6/2011 | Hartshorne et al. | |
| 2011/0290491 A1 | 12/2011 | Gupta et al. | |
| 2012/0015852 A1 | 1/2012 | Quintero et al. | |
| 2012/0132422 A1 | 5/2012 | Mirakyan et al. | |
| 2013/0000911 A1 | 1/2013 | Reddy et al. | |
| 2013/0196883 A1 | 8/2013 | Rincon-Torres et al. | |
| 2013/0233559 A1 | 9/2013 | van Zanten et al. | |
| 2014/0069644 A1 | 3/2014 | Reddy et al. | |
| 2014/0144628 A1 | 5/2014 | Moradi-Araghi et al. | |
| 2014/0155305 A1 | 6/2014 | Hartshorne et al. | |
| 2014/0209305 A1 | 7/2014 | Lin et al. | |
| 2015/0060072 A1 | 3/2015 | Busby et al. | |
| 2015/0075798 A1 | 3/2015 | Tang et al. | |
| 2015/0284625 A1 | 10/2015 | Silveira et al. | |

FOREIGN PATENT DOCUMENTS

| | | |
|---|---|---|
| WO | 2012071462 A1 | 5/2012 |
| WO | 2013158306 A1 | 10/2013 |
| WO | 2014148917 A1 | 9/2014 |
| WO | 2015016905 A1 | 2/2015 |
| WO | 2015094279 A1 | 6/2015 |
| WO | 2015112132 A1 | 7/2015 |

OTHER PUBLICATIONS

International Search Report and Written Opinion for related PCT application PCT/US2015/065224 dated Feb. 17, 2016.
Dash et al., "Grafting of model primary amine compounds to cellulose nanowhiskers through periodate oxidation", Cellulose, 2012, pp. 2069-2079, Springer.
Barati et al., "A Review of Fracturing Fluid Systems Used for Hydraulic Fracturing of Oil and Gas Wells", Journal of Applied Polymer Science, 2014, pp. 1-11, Wiley Periodicals, Inc.
Funkhouser et al., "Hydraulic Fracturing Under Extreme HPHT Conditions: Successful Application of a New Synthetic Fluid in South Texas Gas Wells", SPE Deep Gas Conference and Exhibition held in Manama, Bahrain, 2010, pp. 1-8, SPE 132173.

* cited by examiner

Primary Examiner — Zakiya W Bates
(74) Attorney, Agent, or Firm — Bracewell LLP; Constance Gall Rhebergen

(57) ABSTRACT

A fracturing fluid system for increasing hydrocarbon production in a subterranean reservoir formation comprising a fluid composition and a base fluid, the fluid composition comprising a nano-crosslinker, and a base polymer; and the base fluid operable to suspend the fluid composition, the base fluid comprising water; wherein the fluid composition and the base fluid are combined to produce the fracturing fluid system, wherein the fracturing fluid system is operable to stimulate the subterranean reservoir formation. In certain embodiments, the nano-crosslinker is an amine-containing nano-crosslinker and the base polymer is an acrylamide-based polymer. In certain embodiments, the fracturing fluid systems comprise proppants for enhancing hydraulic fracturing stimulation in a subterranean hydrocarbon reservoir.

20 Claims, 7 Drawing Sheets

HIGH TEMPERATURE FRACTURING FLUIDS WITH NANO-CROSSLINKERS

RELATED APPLICATION

This application claims priority from U.S. Provisional Patent Application No. 62/090,635 filed on Dec. 11, 2014. For purposes of United States patent practice, this application incorporates the contents of the Provisional Patent Application by reference in its entirety.

FIELD OF THE INVENTION

The invention relates to oil and gas well stimulation and compositions for the stimulation of hydrocarbon bearing oil and gas containing formations. In some embodiments, the invention relates to compositions capable of stimulating subterranean hydrocarbon reservoirs under high temperature and/or high pressure conditions. The compositions, in certain embodiments, comprise fracturing fluids which are crosslinked with nano-crosslinker and are therefore capable of transporting proppants during a hydraulic fracturing stimulation process.

BACKGROUND OF THE INVENTION

The reliable, safe and economic production of hydrocarbons is critical to the oil and gas industry. In many instances, hydrocarbon reserves trapped within certain low permeability formations, such as certain sandstone, carbonate, and/or shale formations, exhibit little or no production, and may therefore be undesirable to develop. Methods such as well stimulation may increase the permeability and hence the production of an otherwise unproductive formation or reservoir.

During well stimulation operations, chemicals can be injected into the formation in a process known as well stimulation. Exemplary stimulation techniques include: (1) the injection of chemicals capable of dissolving portions of the formation and creating alternative flow paths for recoverable hydrocarbons through, for example, acid- or matrix-fracturing processes; and (2) the injection of water and/or non-aqueous chemicals through the wellbore and into the formation at pressures that are sufficient to fracture the formation, thereby creating new or additional flow channels through which hydrocarbons can more readily move from the formation into the wellbore.

In certain tight reservoirs, well productivity is typically low, thus making the well non-economical from a standpoint of development. One commonly employed technique for stimulating low productivity wells is hydraulic fracturing, which can involve the injection of fluids, such as high viscosity fluids, into the well at a sufficiently high rate so that enough pressure is built up inside the wellbore to split the formation apart or form fractures. The resulting hydraulically induced fracture can extend from the wellbore deep into the formation.

Hydraulic fracturing fluids are used extensively to enhance productivity from hydrocarbon reservoir formations. These fluids may be supplemented with proppants or other compositions for inducing or increasing fracture conductivity (hereinafter "conductivity"), defined as the product of fracture permeability times the fracture width for a finite conductivity fracture, in a reservoir. In the quest to produce more natural gas resources, considerable attention has been devoted to finding and extracting gas locked within tight formations with permeability in the nanodarcy to microdarcy range. The main challenges associated with working in such formations are the intrinsically high temperature and high pressure bottom hole conditions. For formations with bottom hole temperatures around 350-450° F., traditional hydraulic fracturing fluids that use crosslinked polysaccharide gels, such as guar and its derivatives, are not suitable because of significant polymer breakdown in this temperature range. Fracturing fluids that can work at these temperatures require thermally stable synthetic polymers such as acrylamide-based polymers. However, such polymers have to be employed at high concentrations in order to suspend proppants. The high polymer concentrations make it very difficult to completely degrade at the end of a fracturing operation. As a consequence, formation damage by polymer residue can lower or even block formation conductivity to gas flow.

SUMMARY OF THE INVENTION

The invention relates to oil and gas well stimulation and compositions for the stimulation of hydrocarbon bearing oil and gas containing formations. In some embodiments, the invention relates to compositions capable of stimulating subterranean hydrocarbon reservoirs under high temperature and/or high pressure conditions. The compositions, in certain embodiments, comprise fracturing fluids which are crosslinked with amine-containing nano-crosslinkers and therefor are capable of transporting proppants during hydraulic fracturing stimulation process.

In a first aspect of the present invention, a fracturing fluid system for increasing hydrocarbon production in a subterranean reservoir formation is provided. The fracturing fluid system includes a fluid composition and a base fluid. The fluid composition includes a nano-crosslinker and a base polymer. The base fluid includes water and the base fluid is operable to suspend the fluid composition. The fluid composition and the base fluid are combined to produce the fracturing fluid system. The fracturing fluid system is operable to increase conductivity in the subterranean reservoir formation.

In certain aspects of the present invention, the fluid composition is thermally stable up to a temperature of 450° F. In certain aspects of the present invention, the nano-crosslinker includes a nanomaterial and a crosslinker. In certain aspects of the present invention, the nanomaterial includes a material selected from, but not limited to, the group consisting of silica, cellulose, carbon-based materials, and combinations thereof. In certain aspects of the present invention, the crosslinker includes an amine-containing crosslinker. In certain aspects of the present invention, the base polymer includes an acrylamide-based polymer. In certain aspects of the present invention, the fracturing fluid system further includes a proppant selected from the group consisting of sand, clay, bauxite, alumina and aluminosilicates and combinations thereof. In certain aspects of the present invention, the fracturing fluid system further includes a pH control agent selected from the group consisting of potassium hydroxide, sodium hydroxide, acetic acid, potassium carbonate, sodium carbonate, potassium bicarbonate, sodium bicarbonate, hydrochloric acid and combinations thereof. In certain aspects of the present invention, the fracturing fluid system further includes an antioxidant selected from, but not limited to, the group consisting of phenols, polyphenols, di-tertbutyl alkyl phenols, hydroquinone, apigenin, resveratrol, ascorbic acid, tocopherol, sodium thiosulfate, sodium thiosulfate, isopropanol, methanol, ethylene glycol, thiourea, and combinations thereof. In certain aspects of the present invention, the fracturing fluid system further includes a clay stabilizer selected from, but not limited to, the group consisting of sodium chloride, potassium chloride, ammonia chloride, tetramethylammonium chloride (TMAC), other quaternary molecules and combinations thereof. In certain aspects of the present invention, the fluid composition reduces the polymer loading which is required to stimulate the subterranean reservoir formation by at least 25%. In certain aspects of the present invention, the fluid composition reduces the polymer loading which is required to stimulate the subterranean reservoir by at least 50%.

In a second aspect of the present invention, a method for increasing conductivity in a hydrocarbon producing subterranean reservoir formation is provided. The method includes the steps of identifying a hydrocarbon producing subterranean reservoir formation and introducing an effective amount of the fracturing fluid system into the hydrocarbon producing subterranean reservoir formation such that conductivity is increased within fractures.

In certain aspects of the present invention, the fracturing fluid system includes a nanomaterial selected from, but is not limited to, the group consisting of silica, cellulose, carbon-based materials, and combinations thereof. In certain aspects of the present invention, the fracturing fluid system is thermally stable up to a temperature of 450° F. In certain aspects of the present invention, the fracturing fluid system includes an amine-containing crosslinker. In certain aspects of the present invention, the fracturing fluid system includes a proppant selected from the group consisting of sand, clay, bauxite, alumina and aluminosilicates and combinations thereof. In certain aspects of the present invention, the conductivity is increased within fractures by at least 25%. In certain aspects of the present invention, the conductivity is increased within fractures by at least 50%.

In a third aspect of the present invention, a fracturing fluid system for increasing hydrocarbon production in a subterranean reservoir formation is provided. The fracturing fluid system includes a fluid composition and a base fluid. The fluid composition includes a base polymer and a nano-crosslinker. The base polymer includes an acrylamide-based polymer. The nano-crosslinker includes a nanomaterial and a crosslinker. The nanomaterial includes a material selected from the group consisting of silica, cellulose, carbon-based materials, and combinations thereof. The crosslinker includes an amine-containing crosslinker. The base fluid includes water.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
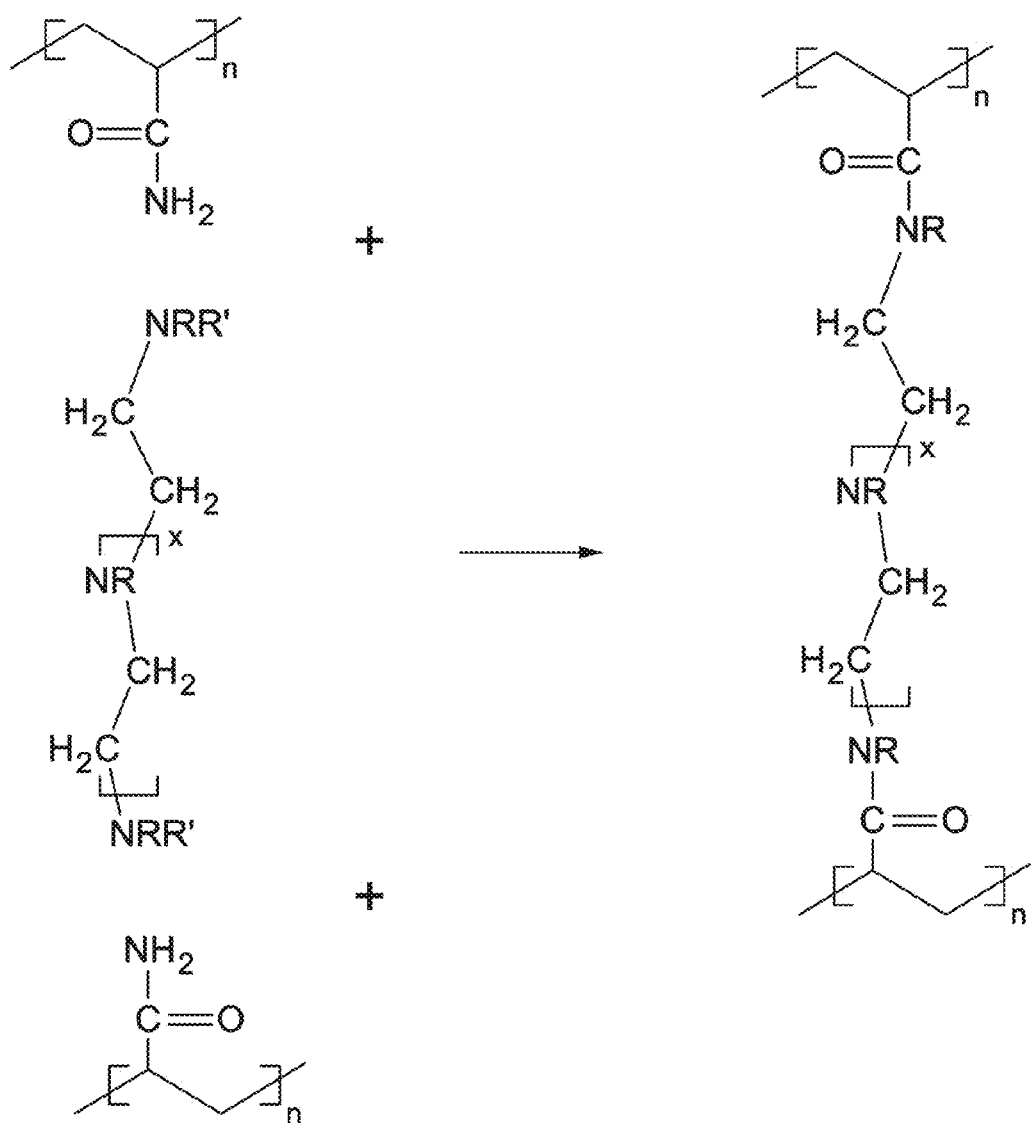
FIG. 1 shows a chemical reaction scheme between polyacrylamide (PAAM) and polyethyleneimine (PEI).

Although the following detailed description contains specific details for illustrative purposes, the skilled artisan will appreciate that many examples, variations and alterations to the following details are within the scope and spirit of the invention. Accordingly, the exemplary embodiments of the invention described herein and provided in the appended figures are set forth without any loss of generality, and without undue limitations, on the claimed invention.

As used herein, the term "nanomaterial" refers to a material defined by at least one dimensional measurement up to and including 1000 nanometers (nm), alternately less than 500 nm, alternately less than 100 nm, and alternately less than 50 nm. As used herein, nanomaterial encompasses and includes nanoparticles, nanocompounds and nanofibers. For example, a sphere shaped nanomaterial can have a diameter of up to 1000 nm. For example, a fibrous nanomaterial in the shape of cylindrical nanofiber can have a diameter of up to 1000 nm. A nanomaterial in accordance with the present invention may comprise a crystalline material, a semicrystalline material such as a semicrystalline polymer, an amorphous solid and combinations thereof. In some embodiments, the nanoparticle is exclusively a crystalline material. In addition, a nanoparticle for use in the present invention may assume any number of geometric shapes, including but not limited to spheres, plates, rods and discs as well as Platonic solids such as cubes, tetrahedra, octahedra, dodecahedra and icosahedra. The use of a particular shape or geometry for a nanoparticle of the present invention may derive from a desired or expected property associated with the shape or geometry. For example, compositions comprising rod shaped nanoparticles in accordance with the present invention are expected to exhibit a greater relative viscosity as compared to compositions comprising spherical nanoparticles. A fiber is considered to have a rod shape for the purposes of this invention. As used herein, "rod" refers to a cylindrical shape having a diameter and a height. Nanomaterials for use in the present invention can be commercially obtained or can be synthesized as part of the process. It will be understood by one of skill in the art that the nanomaterials are not suitable for use as proppants. Without being bound to a particular theory, it is understood that proppants require certain mechanical properties, such as, for example, crush strength. The nanomaterials suitable for use in the fracturing fluid system of the present invention are smaller in size than the proppants used in the fracturing fluid system of the present invention.

As used herein, a "crosslinker" refers to a compound capable of chemically bonding to and thereby connecting ("crosslinking") two or more individual polymers. In certain embodiments, the crosslinker may form one or more covalent bonds with the polymers. A crosslinker, in accordance with the present invention, may bond to a polymer via a carbonyl, sulfhydryl, amine or imine chemical group on the crosslinker. A crosslinker for use in the present invention is not limited to any particular spacial arrangement and may, in certain embodiments, assume one or more of a linear, branched or dendrimeric structure prior to or following bonding to two or more individual polymers.

As used herein, a "nano-crosslinker" refers to a nanomaterial capable of chemically bonding to and thereby connecting ("crosslinking") two or more individual polymers. The nano-crosslinker can be created by surface modification of a nanomaterial with a crosslinker. The nano-crosslinker can be produced by pre-treating the nanoparticle with the crosslinker, whereby the crosslinker has been functionalized onto the nanoparticle. The nano-crosslinker can be a nanoparticle embedded with a crosslinker. The nano-crosslinker can be prepared by grafting a crosslinker onto a nanomaterial. In certain embodiments, the crosslinker forms a coating on the nanomaterial. Advantageously, grafting the crosslinker onto the nanomaterials extends the length of the crosslinker in ways such that inter-crosslinking may be favored over intracrosslinking when using a larger crosslinker. Inter-crosslinking or intermolecular bonds are bonds which exist between two different molecules. In the present invention, inter-crosslinking is favored because increased inter-crosslinking increases the network between the base polymer molecules and the increased network increases the viscosity. In the fracturing fluid system of the present invention, the amount of crosslinker used is less than the base polymer so it can be more cost effective to coat the crosslinker onto the nanomaterials instead of the base polymers onto the nanomaterials. In embodiments where the nano-crosslinker includes an amine-containing crosslinker, the nano-crosslinker can be prepared by interacting amine-containing molecules and the nanomaterials through ionic interactions, non-covalent bonding, or covalent bonding. It will be understood by one of skill in the art that the nano-crosslinkers of the present invention are not suitable for use as proppants in the fracturing fluid system of the present invention.

As used herein, the term "nanowhisker" refers to a filamentous crystalline nanoparticle formed, for example, via acid hydrolysis, vapor-liquid-solid (VLS) growth, molecular beam epitaxy or interfacial precipitation. In non-limiting embodiments, a nanowhisker can comprise a carbohydrate including but not limited to cellulose, a metal oxide, or a carbon allotrope including but not limited to fullerene.

As used herein, "proppant" refers to a compositional solid or gel capable of maintaining or further inducing a hydraulic fracture in a subterranean hydrocarbon reservoir. Accordingly, solid proppants can be of uniform size and shape or may be heterogeneous or irregular in size and shape, for example, where compaction of the proppant is desired for reducing fracture width and resulting conductivity. Non-limiting examples of proppants for use with the present invention include naturally occurring and manufactured compositions such as sand and other silica based compounds; ceramics including clay, bauxite and alumina; metal, metalloid and crystal based compositions such as those disclosed in U.S. Pat. No. 7,721,803 to Huang et al.; and resin coated proppant particles including sand, ceramics and any other substrate capable of serving as a proppant, where the resin may comprise one or more of an epoxy, a furan and a phenol based polymer. The proppants suitable for use in the fracturing fluid system of the present invention are larger in size than the nanomaterials used in the fracturing fluid system of the present invention.

As used herein, "fluid composition" refers to a composition that is incorporated into a fracturing fluid for use in stimulating production in a subterranean reservoir formation according to the present invention. The fluid composition is composed of a nano-crosslinker and a base polymer.

The present invention addresses problems associated with the introduction of fracturing fluids and proppants into high temperature subterranean formations for stimulating production in a subterranean reservoir. Embodiments of the fracturing fluid system described herein advantageously increase the conductivity of a subterranean reservoir fracture by reducing the polymer concentration required to fracture the reservoir as compared to other fracturing fluids. The reduced polymer load amount diminishes the volume of polymer gel residue potentially retained in the reservoir fractures. In addition to the operational advantages, including but not limited to reduced blockages/increased conductivity and reduced difficulties in subsequent reservoir cleanup activities, the present invention addresses potential environmental and regulatory issues associated with, for example, excessive material discharge and residue in a fracture fluid treated reservoir.

The compositions and methods provided herein solve several problems that are frequently encountered during the operation of subterranean reservoir formations, including fractures within the formations, where high temperature and pressure conditions are encountered.

In certain embodiments, the compositions and methods described herein advantageously and unexpectedly mitigate formation damage that can be caused, for example, by a traditional fracturing gel, water blockage, and/or condensate banking. The formation damage caused by these conditions results in reduced permeability of fluids within the formation, and subsequently leads to poor production of a well.

The present invention provides for methods and compositions capable of stimulating hydrocarbon production in subterranean formations.

The present invention includes the fracturing fluid system for increasing hydrocarbon production in a subterranean reservoir formation. The fracturing fluid system is produced by introducing the fluid composition to a base fluid and mixing the two components together. The fracturing fluid system for use with the present invention can be designed based on its physicochemical properties, included but not limited to viscosity, rheology, miscibility and thermal stability, as well as those properties associated with the ability to carry proppants into fractures. The fracturing fluid system can reduce the damage in the subterranean reservoir formation. The fracturing fluid system is thermally stable (exhibits fluid stability) at temperatures between about 300° F. (148° C.) and about 450° F. (232° C.) and alternately at temperatures between about 350° F. (176° C.) and 400° F. (204° C.). In preferred embodiments, the fracturing fluid system is thermally stable up to a temperature of about 400° F. (204° C.). In certain embodiments, the fracturing fluid system is in an absence of components that are not thermally stable up to the temperature of 400° F., for example, polysaccharide gels, such as guar gum. The fracturing fluid system is capable of advantageously stimulating conductivity and fracture formation in a hydrocarbon producing subterranean formation at a reduced component quantity, reduced polymer quantity/concentration as compared to presently available commercial fracturing fluids. The fracturing fluid can carry the proppant to the subterranean reservoir formation. The polymer loading of the base polymer in the fracturing fluid system is less than 60 pptg (pounds of base polymer per thousand gallons base fluid), alternately between 20 pptg and 45 pptg and alternately between 25 pptg and 40 pptg. As used herein "polymer loading" refers to the total weight of base polymer (in pounds) added to the base fluid as part of the fracturing fluid system. In some embodiments, the fracturing fluid system reduces the overall polymer loading required in a stimulation fluid by between about 20% and about 75%, preferably by at least about 25%, preferably by at least about 50%, preferably by between about 25% and about 75%, and more preferably by between about 30 and about 50% as compared to presently available commercial fracturing fluids. In at least embodiment of the invention, a polymer loading of 45 pptg corresponds to a concentration of base polymer of 0.54 wt % in the base fluid. It is understood by one of skill in the art that conventional fracturing fluids include about 1 wt % of polymer and crosslinker.

The base fluid can be any fluid capable of fracturing a subterranean formation while suspending the fluid composition. Example fluids suitable for use as the base fluid include aqueous fluids, non-aqueous fluids, or combinations thereof. Examples of aqueous fluids include water, a metallic or inorganic salt solution such as brine, or combinations thereof. Examples of non-aqueous fluids include a polar fluid such as an alcohol, a non-polar fluid such as a hydrocarbon, or combinations thereof. Examples of alcohols include methanol and ethanol. Brines can include sodium acetate. In certain embodiments, the base fluid can include water, ethanol, sodium acetate, or combinations thereof.

The fluid composition includes a nano-crosslinker and a base polymer. The fluid composition is a gel or gel-like substance that can be suspended in a fluid and carried into the fractures. The ratio of nano-crosslinker to base polymer in the fluid composition can be in the range of 1:0.1 to 1:1000, alternately can be in the range from 1:1 to 1:100. The crosslinking of the base polymer by the nano-crosslinker is activated by the elevated temperatures in the subterranean reservoir formation. As used herein, the term "elevated" refers to the temperatures in the subterranean reservoir formation being at a temperature greater than the temperature at the surface. Without being bound to a particular theory, it is understood that a small amount, less than 10%, of crosslinking of the base polymer by the nano-crosslinker can occur when the components are initially mixed, but that full crosslinking, greater than 90%, does not occur until the fracturing fluid system reaches a temperature between about 120° F. and about 150° F. The temperature at which full crosslinking is achieved varies based on the chemistry of the nano-crosslinker and base polymer. In certain embodiments, the fracturing fluid system of the present invention is a delayed system.

The base polymer is any gelling agent capable of bonding to a crosslinker or nano-crosslinker and remaining thermally stable at temperatures between about 250° F. (121° C.) and about 450° F. (232° C.). The base polymer can be natural or synthetic. The base polymer can include acrylamide-based polymer or polyacrylamide-based polymer. Examples of acrylamide-based polymers include polyacrylamide, partially hydrolyzed polyacrylamide, copolymers of polyacrylamide with other monomers, and combinations of the same.

Without being bound to a particular theory, it is believed that nano-crosslinkers improve rheological properties of a fluid due to their high surface area and high surface forces, such as electrostatic and van der Waals' forces. The nano-crosslinker can be capable of improving the rheological properties of a crosslinked gel at elevated temperatures, that is temperatures between 250° F. (121° C.) and 450° F. (232° C.). The ratio of nanomaterial to crosslinker in the nano-crosslinker is between 1:0.01 by weight and 1:1000 by weight, alternately between 1:0.1 by weight and 1:50 by weight, and alternately between 1:1 and 1:100.

Figure 2:
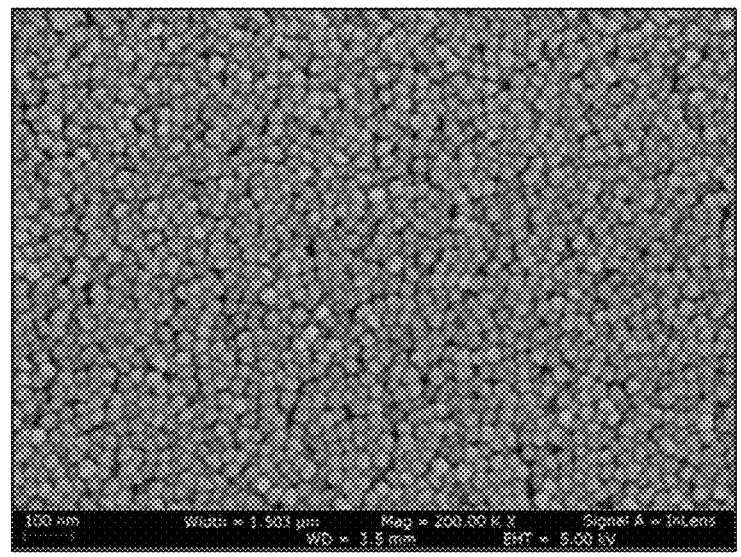
FIG. 2 shows electron micrographs of non-limiting geometric shapes of nanoparticles in accordance with some embodiments of the present invention. The images were recorded on a Zeiss Ultra 55 field emission scanning electron microscope at 5 kilovolt (kV) accelerating voltage following sputter coating with 5 nanometer (nm) of platinum/palladium (Pt/Pd) alloy. The micrographs were recorded at magnifications of 200,000× for the spherical nanoparticles (upper image) and 125,680× for the rod-shaped nanoparticles (lower image).
Figure 2:

The nanomaterial can be any nanocompound capable of being associated with the crosslinker. The nanomaterial can include inorganic materials, organic materials, or combinations thereof. Examples of inorganic materials suitable for use as the nanomaterial include silica. Examples of organic materials suitable for use as the nanomaterial include cellulose and carbon-based materials. In embodiments, the nanomaterial comprises silica, cellulose, carbon-based materials or combinations thereof. In a preferred embodiment, silica-based nanoparticles have a uniform size distribution. The top image in FIG. 2 provides SEM images of examples of silica-based nanoparticles. The concentration of nanomaterials in the fluid composition can be between 0.1 ppm and 10,000 ppm, alternately between 1 ppm and 1,000 ppm, alternately between 10 ppm and 200 ppm, alternately between 10 ppm and 100 ppm. In at least one embodiment of the present invention, the concentration of nanomaterials in the fluid composition is 72 ppm.

The crosslinker can be any chemical compound capable of crosslinking the base polymer. In embodiments where the base polymer is an acrylamide-based polymer, the crosslinker is an amine-containing crosslinker. Examples of amine-containing crosslinkers suitable for use as the crosslinker include amines, polyamines, copolymers of amines and other monomers, or combinations thereof. Examples of polyamines suitable for use as the amine-containing crosslinker include polyethylenimine (PEI), spermidine, spermine, polypropylenimine, poly(N-vinylimidazole), polyamines, polyamides, polyimines and polyimides. Polyethylenimine is also known as polyaziridine.

The fluid composition, in certain embodiments, further comprises a proppant selected from the group consisting of sand, clay, bauxite, alumina and aluminosilicates.

Additives can be included in the fracturing fluid system and can be incorporated as part of the fluid composition, can be added to the base fluid (prior to mixing with the fluid composition) or can be added directly to the fracturing fluid system. The fracturing fluid system can include one or more of the following additives such as a pH control agent, an antioxidant (gel stabilizer), a clay stabilizer, a breaker compound including an emulsion breaker or gel breaker, a corrosion inhibitor and a scale inhibitor.

The pH control agent can include, but is not limited to, potassium hydroxide, sodium hydroxide, acetic acid, potassium carbonate, sodium carbonate, potassium bicarbonate, sodium bicarbonate, and hydrochloric acid.

The antioxidant (gel stabilizer) can be any chemical compound capable of stabilizing the resultant polymer formed when the nano-crosslinker gels the base polymer. Examples of chemical compounds suitable for use as the antioxidant (gel stabilizer) can include, but are not limited to, phenols, polyphenols, di-tertbutyl alkyl phenols, hydroquinone, apigenin, resveratrol, ascorbic acid and tocopherol, sodium thiosulfate, sodium thiosulfite, isopropanol, methanol, ethylene glycol, thiourea, and combinations of the same.

Examples of chemical compounds suitable for use as the clay stabilizer include, but are not limited to, sodium chloride, potassium chloride, ammonia chloride, tetramethylammonium chloride (TMAC), other quaternary molecules, and combinations of the same.

The breaker compound can be any compound capable of decomposing the base polymer, for example when the base polymer is a polyacrylamide gel and thus reducing the viscosity of the fracturing fluid system. The breaker compound can include an emulsion breaker or a gel breaker. The breaker compound can include an oxidizer type compound. Examples of oxidizer type compounds that can be used as the breaker compound include sodium bromate. In some embodiments, the breaker compound can be encapsulated. In at least one embodiment, the breaker compound is an encapsulated sodium bromate. The encapsulation reduces the rate at which the gel breaker acts to reduce the viscosity.

The fracturing fluid system of the present invention can maintain a viscosity above 500 cP (at a shear rate of 40 $s^{-1}$) for at least 50 minutes and alternately more than 50 minutes.

The fracturing fluid system has sufficient proppant carrying viscosity (herein, "sufficient proppant carrying viscosity" means a viscosity greater than 500 cP (at a shear rate of 40 $s^{-1}$) for at least 50 minutes), such that proppants are carried into the fracture network without settling out of suspension. Advantageously, the fracturing fluid system, and more particularly the fluid composition leaves minimal residue in the formation.

The fracturing fluid system is injected into the subterranean formation at pressures capable of producing fractures in the subterranean formation.

In at least one embodiment of the present invention, the nano-crosslinker does not swell in the presence of water. In at least one embodiment of the present invention, the cross-linking of the nano-crosslinker and the base polymer is accomplished in the absence of a metal, metal cation, or metal complex. In at least one embodiment of the present invention, the nano-crosslinker is in the absence of a metal, metal cation, or metal complex. In certain embodiments of the present invention, the nano-crosslinker does not degrade in order to crosslink the base polymer, such that the nano-crosslinker becomes a part of the polymer matrix. In certain embodiments of the present invention, the crosslinker is not released from the nanomaterial to polymerize the base polymer.

In at least one embodiment of the present invention, the fracturing fluid system includes an aqueous-based fluid, an acrylamide-based polymer, and an amine-containing nano-crosslinker.

In at least one embodiment of the present invention, the fracturing fluid system includes an aqueous-based fluid as the base fluid, an acrylamide-based polymer as the base polymer, an amine-containing nano-crosslinker as the nano-crosslinker, a breaker compound, a pH control agent, and a clay stabilizer.

Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following example illustrates the viscosity of the fracturing fluid systems produced according to the methods and compositions of the present invention in comparison with conventional fracturing fluids.

Example 1

Silica Nanoparticles Synthesis

The 35 nm silica nanoparticles in accordance with the present invention were synthesized using a modified protocol described in Hartlen et al. (2008) *Langmuir* 24, 1714-1720. Generally, one example of the current invention includes the following experiment: 2.308 g of L-arginine (98%; Sigma-Aldrich, St. Louis, Mo.) was added to a flask containing 38.5 mL ethanol (200 proof; Thermo Fisher Scientific, Waltham, Mass.) and 461.5 mL ultra-pure water. The resulting solution was stirred at 150 rpm and heated from room temperature (approximately 20° C.) to 65° C. on a stirring hot plate. A 31.25 mL solution of 0.3 M tetraethylorthosilicate (TEOS (98%); Sigma-Aldrich, St. Louis, Mo.) was slowly added to the solution and stirred at 150 rpm and 65° C. for 24 hours, yielding an 18 mg/mL solution of 35 nm silica-based nanoparticles.

Synthesis of Amine-Containing Nano-Crosslinker

The crosslinker was a commercially available polyethylenimine (PEI) solution, Epomin P-1050 (MW=70,000; Aceto Corporate USA, Port Washington, N.Y.). The PEI solution was prepared by dissolving 50 grams of Epomin P-1050 into 100 mL of 300 mM sodium acetate buffer (Sigma Aldrich, St. Louis, Mo.).

A stock solution of 250 mg/ml resin content Epomin P-1050 was prepared by homogenizing 50 g of the as-received Epomin P-1050 (PEI, 70,000 MW) into 100 g of 300 mM acetate buffer. Into this solution, the 35 nm silica-based nanoparticles suspension was added in 125 aliquots, each of 400 microliter (µL), in one minute intervals. At the completion of the addition, the suspense was collected and cleaned via diafiltration on a cross-flow filtration device by a KrosFlo® Research IIi Tangential Flow Filtration System with a 750 kD polyethersulfone (PES) membrane. This resulted in an amine-containing nano-crosslinker. The concentration of nanoparticles in the amine-containing nano-crosslinker was 9 mg/mL, while the concentration of Epomin P-1050 coating was determined, using thermogravimetric analysis (TGA), to be four times the weight of the (uncoated) silica nanoparticles for a concentration of 36 mg/mL crosslinker in the amine-containing nano-crosslinker.

General Procedure to Make Fracturing Fluid Systems. The base polymer was a commercially available synthetic polymer capable of performing as a viscosifying/suspension agent at elevated temperatures, hydrated HE® 100 (Chevron Phillips Chemical Company, The Woodlands, Tex.). The fracturing fluid was water. Fluid samples were prepared using a Waring blender. For example, a 45 pounds per thousand gallons (pptg) base gel was prepared by hydrating 5.4 grams of HE® 100 dissolved in 1 liter of tap water. Additional additives such as pH control and antioxidant were added to the base polymer solution followed by different amounts of the nano-crosslinker according to Table 1. produced by mixing the amine-containing nano-crosslinker at a concentration of 5 gallons of nano-crosslinker per thousand gallons of base fluid (gpt) of with a solution of to produce a 45 pounds per thousand gallons (pptg) fracturing fluid system.

Table 1 details the fracturing fluid systems produced and tested in Example 1.

| Fracturing Fluid System | Concentration of Nano-crosslinker | Base Polymer Concentration |
|---|---|---|
| A | 5 gpt | 45 pptg |
| B | 7 gpt | 45 pptg |
| C | 8 gpt | 45 pptg |
| D | 10 gpt | 45 pptg |

Physicochemical Measurements and Performance of Fracturing Fluid System.

Figure 3:
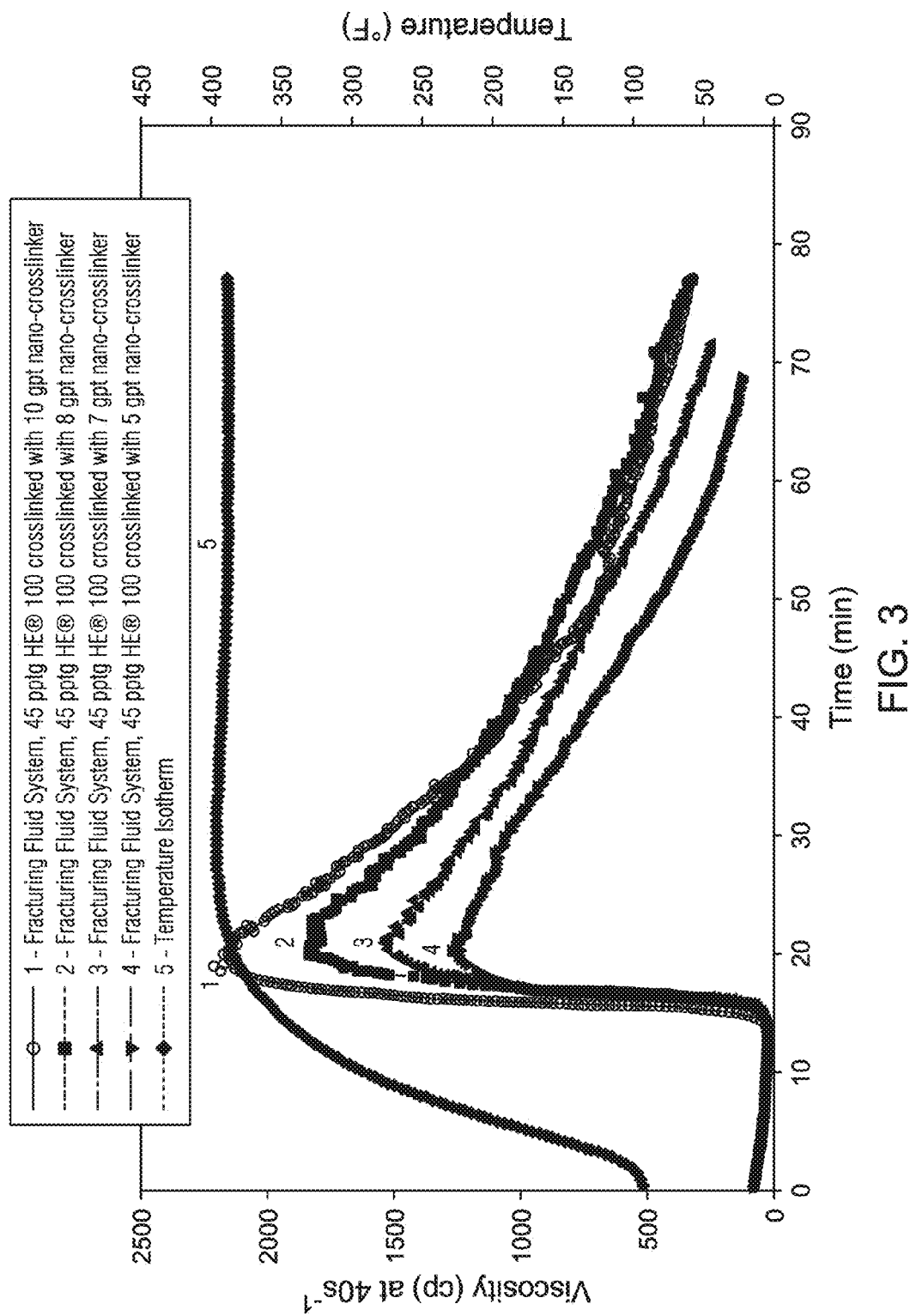
FIG. 3 shows the viscosity curve (in centipoise (cP)) at 40 $s^{-1}$ shear rate and 400° F. for the four fracturing fluid systems (A, B, C, and D) according to Example 1.
Figure 4:
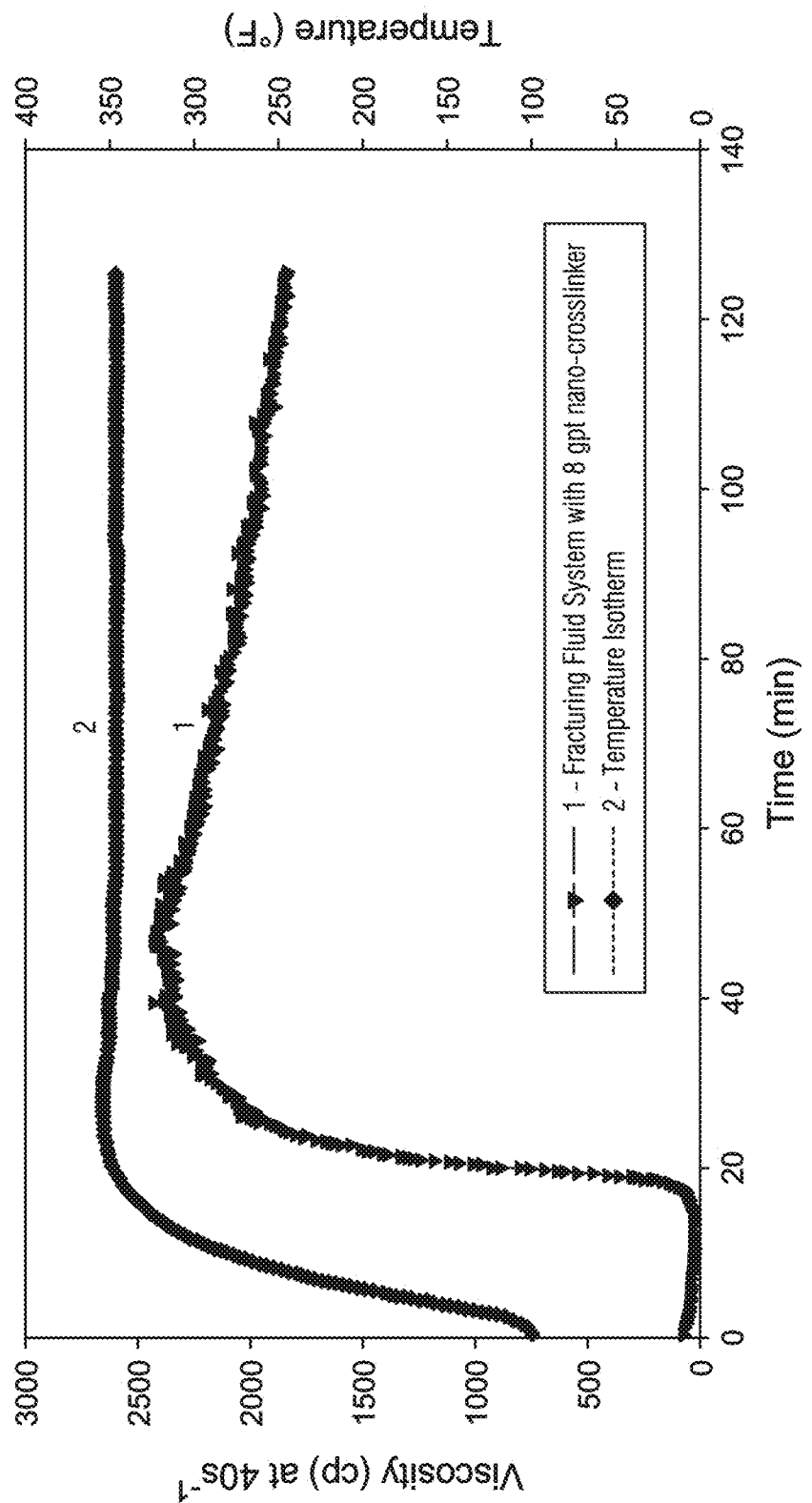
FIG. 4 shows a viscosity curve (in cP) at 40 $s^{-1}$ shear rate and 350° F. for a fracturing fluid system C according to Example 1.
Figure 5:
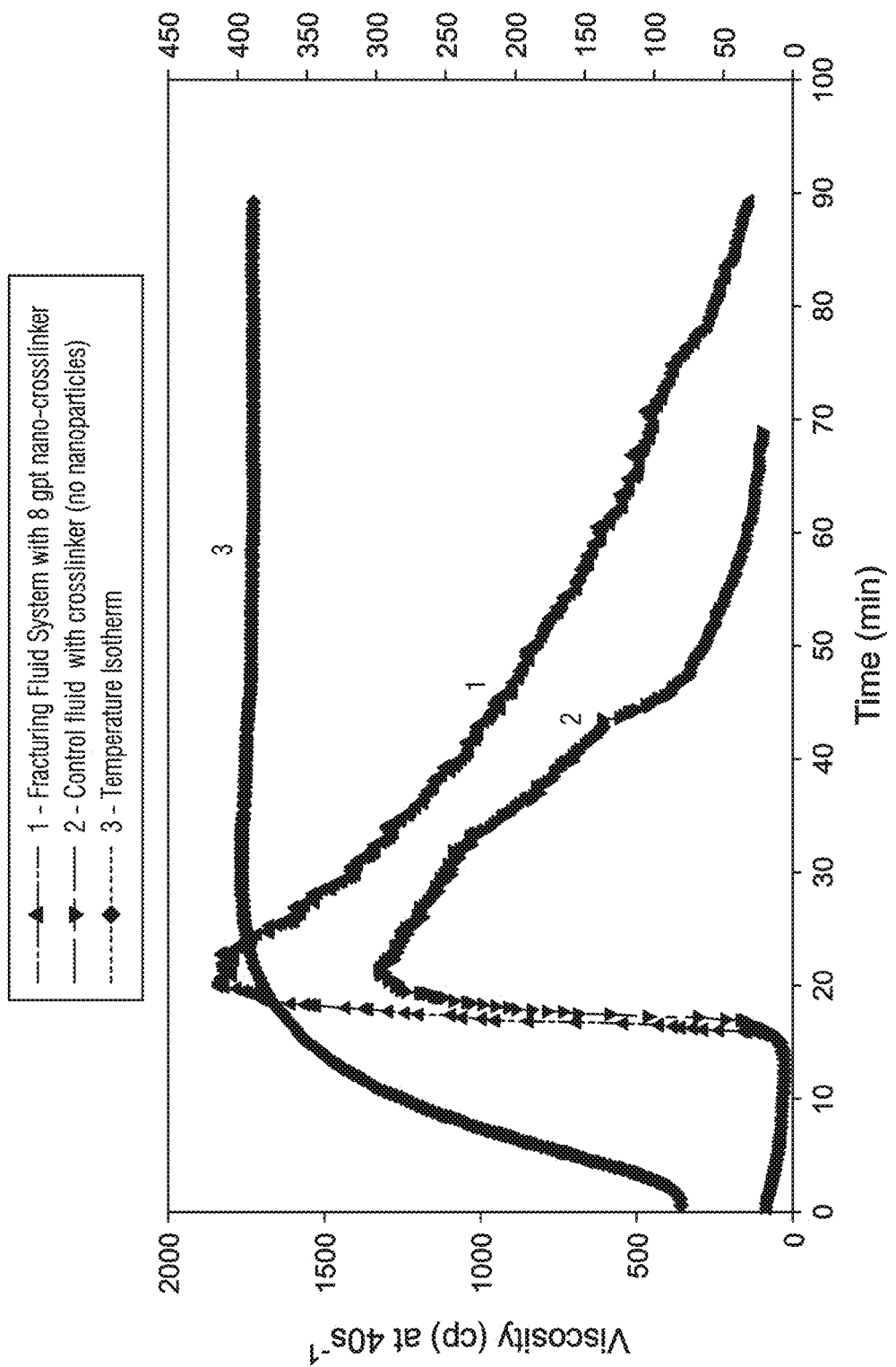
FIG. 5 shows a comparison of viscosity curves (in cP) at 40 $s^{-1}$ and 400° F. between a 45 pptg fracturing fluid system C (with nano-crosslinker) and a 45 pptg control crosslinked fluid without nano-crosslinker according to Example 1.

To measure the viscosity of each of the fracturing fluid systems under reaction conditions designed to simulate those in a high temperature and high pressure subterranean reservoir formation, 52 mL aliquots of each fracturing fluid system were injected into a Grace M5600 HPHT rheometer equipped with a B5 bob configuration. Under the reaction conditions, the nano-crosslinker reacts with the base polymer and increases the viscosity of the fracturing fluid system. FIG. 3 shows the viscosity curves produced by fracturing fluid system A, fracturing fluid system B, fracturing fluid system C, and fracturing fluid system D at a shear rate of 40 $s^{-1}$ and a temperature of 400° F. FIG. 4 shows the viscosity curve produced by fracturing fluid system C at a shear rate of 40 $s^{-1}$ and a temperature of 350° F. According to FIG. 4, the viscosity is at least 1800 cP for greater than 120 minutes at 350° F. FIG. 5 shows the comparison of viscosity curves (in (cp)) at 40 $s^{-1}$ between the 45 pptg crosslinked fracturing fluid system C and a control 45 pptg fluid with Epomin P-1050 only (without nanoparticles; same amount of Epomin P-1050 as fracturing fluid system C with the nano-crosslinker) at 400° F. As can be seen in FIG. 5, the viscosity performance of fracturing fluid system C is better than the control fluid without nano-crosslinker, that is the viscosity of fracturing fluid system C stays above 500 cP for a longer period of time. These results were compared to literature values for commercially available, high temperature fracturing fluids injected to a fracture at concentrations of 66 pounds per thousand (ppt) and 88 ppt as described in Funkhouser et al. 2010. Hydraulic Fracturing Under Extreme HPHT Conditions: Successful Application of a New Synthetic Fluid in South Texas Gas Wells. Paper SPE132173 presented at the Society of Plastic Engineers Deep Gas Conference and Exhibition, Manama, Bahrain, 24-26 Jan. 2010 (hereinafter "Funkhouser"). The concentration values were obtained using the published value provided in FIG. 2 of Funkhouser for the 66 ppt fluid (with a high temperature polymer mass/volume percentage of 0.79%), while the 88 ppt value results from the mathematical product of the 66 ppt fluid concentration and the fluid polymer mass/volume percentage ratio, i.e. (66 ppt*(1.05%/0.79%)). When compared to the fluids in Funkhouser, it was noted that the present invention exhibited thermal stability at 400° F. while advantageously requiring approximately 30-50% less fluid for fracture treatment.

Figure 6:
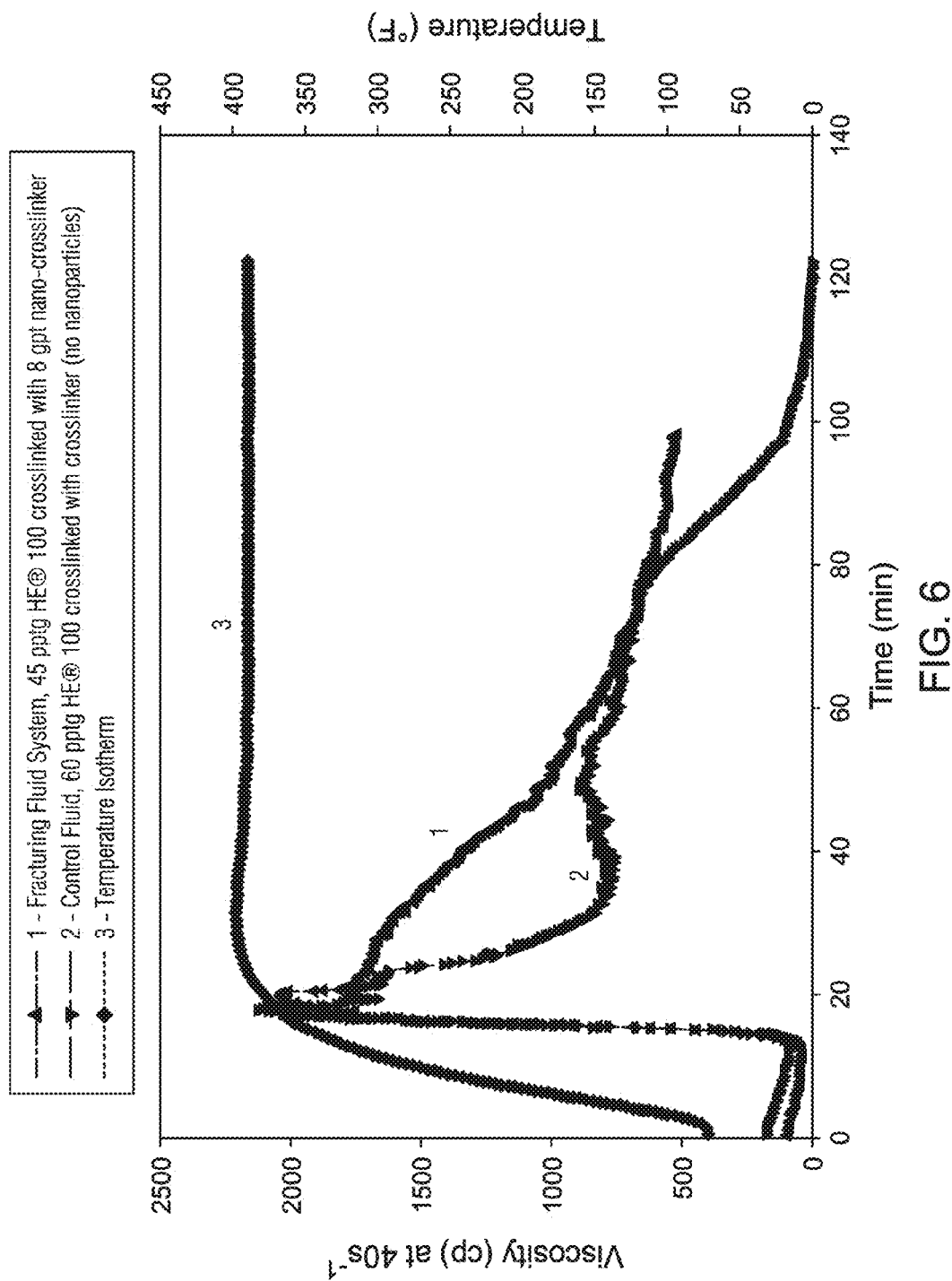
FIG. 6 shows a comparison of viscosity curves (in cP) at 40 $s^{-11}$ at 400° F. between a 45 pptg fracturing fluid system C (with nano-crosslinker) and a 60 pptg control fluid without nano-crosslinker according to Example 1.

As shown in FIG. 6, the fluid viscosity of fracturing fluid system C was compared to a fluid containing the same amount of Epomin P-1050, but without nanoparticles, for a 60 pptg HE®100 fluid. The fracturing fluid system C exhibited comparable viscosity at a 25% polymer loading reduction and a resulting decreased fluid composition volume required for fracture treatment.

Example 2

Synthesis, Physicochemical Measurements and Performance of Nanowhisker Based Nanofluid Solution Compositions Cellulose nanowhiskers were oxidized based upon a modified protocol described in Dash et al., *Cellulose* 19, 2069 (2012). Briefly, an aqueous dispersion of cellulose nanowhiskers (250 mL, 2 wt % m/v) was sonicated on a ⅛" diameter microtip sonicator for 30 minutes employing a pulse duration of 2 seconds followed by a delay of 2 seconds at an amplitude of 30%. After cooling to room temperature, 0.6 grams (2.80 mmols) of sodium periodate was added to the suspension under magnetic stirring. The reaction was covered with aluminum foil (to prevent photolysis) and stirred at room temperature for approximately 48 hours.

The resulting suspension was dialyzed against 3 liters of deionized water using a 10,000 Dalton molecular weight cut-off (MWCO) dialysis membrane with frequent exchanges of dialysate for approximately 72 hours. For grafting Epomin P-1050 onto the oxidized cellulose nanowhiskers, an appropriate amount of Epomin P-1050 dispersed in 200 mL of acetic acid/acetate buffer (pH 4.5) was added to a round bottom flask. A 50 mL drop-wise addition funnel was attached to the round bottom flask for mixing with the oxidized nanowhisker suspension. The nanowhisker solution was added to the Epomin P-1050 at a rate of approximately 1 mL/min with rapid magnetic stirring. The reaction was allowed to proceed for approximately 6 hours before the addition of an excess of $NaBH_4$ (2-fold mass excess relative to Epomin P-1050). The reaction was stirred overnight prior to neutralization using 1 molar hydrochloric acid (aqueous). After neutralization, the crude mixture was purified via diafiltration on a cross-flow filtration device.

Fracturing fluid systems comprising 45 pptg HE® 100 crosslinked with different concentrations of Epomin P-1050 coated nanowhiskers were produced. The nanowhisker concentration in each fracturing fluid system was 4.6 mg/mL. The Epomin P-1050 concentration in each fracturing fluid system was 25 mg/mL.

Table 2 details the fracturing fluid systems produced and tested in Example 2.

| Fracturing Fluid System | Concentration of Nano-crosslinker | Base Polymer Concentration |
|---|---|---|
| E | 5 gpt | 45 pptg |
| F | 10 gpt | 45 pptg |
| G | 20 gpt | 45 pptg |
| H | 30 gpt | 45 pptg |
| I | 35 gpt | 45 pptg |

Figure 7:
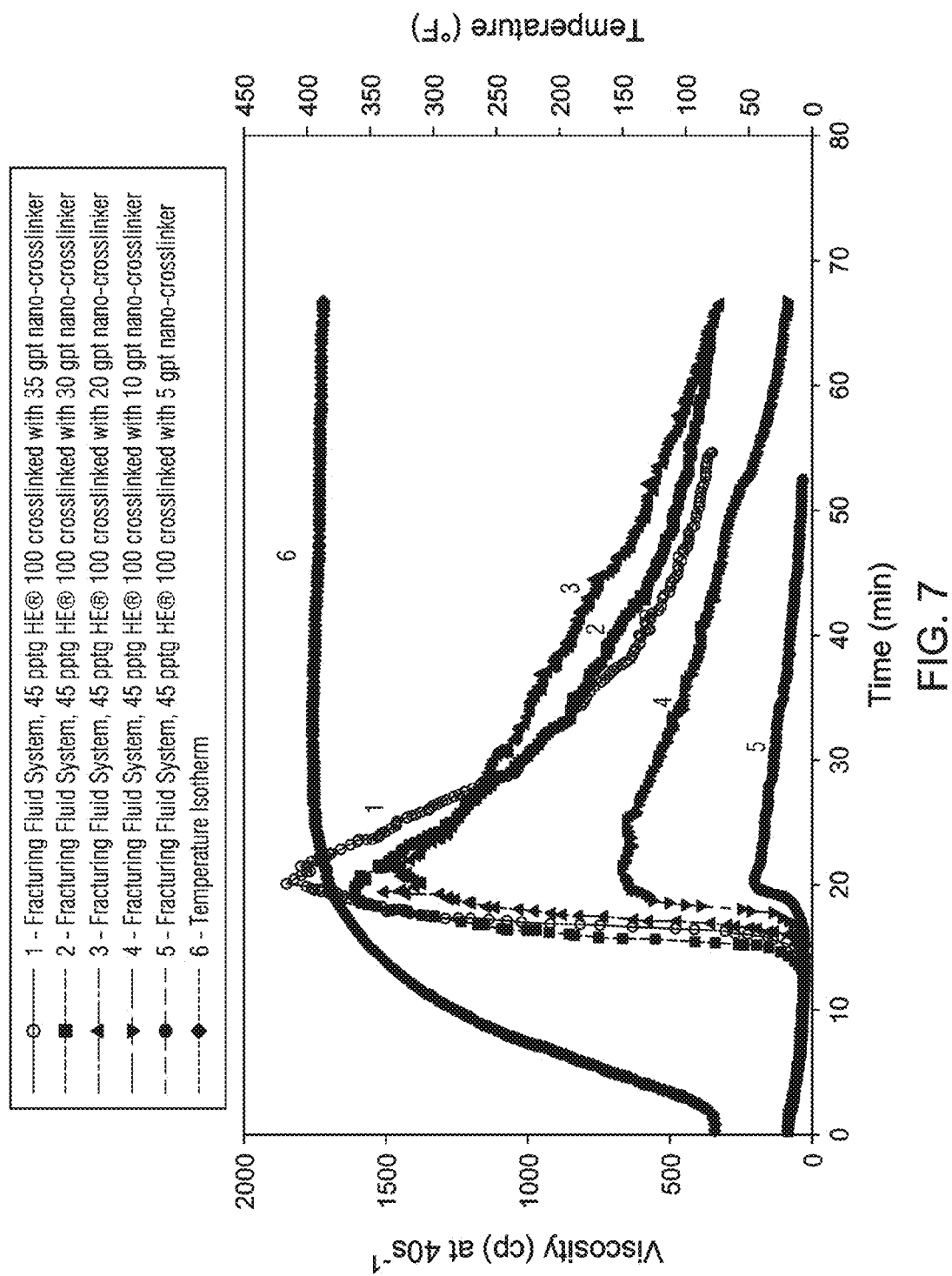
FIG. 7 shows a comparison of the viscosity curves (in cP) at 40 $s^{-1}$ at 400° F. for the fracturing fluid systems according to Example 2.

Fracturing fluid systems were produced according to Table 2 and evaluated in a Grace M5600 HPHT rheometer equipped with a B5 bob configuration. The viscosity curves at 40 $s^{-1}$ shear rate and 400° F. for each fracturing fluid system of Example 2 are shown in FIG. 7.

Based on the viscosity curves, it was determined that the fracturing fluid system G comprising 20 gpt of nanowhisker type nano-crosslinker exhibited the best viscosity and thermal characteristics, that is the viscosity of fracturing fluid system G is greater than 500 cP for a longer period of time than any other fracturing fluid tested.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural references, unless the context clearly dictates otherwise.

"Optional" or "optionally" means that the subsequently described component may or may not be present or the event or circumstances may or may not occur. The description includes instances where the component is present and instances where it is not present, and instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

What is claimed is:

1. A fracturing fluid system for increasing hydrocarbon production in a subterranean reservoir formation, the fracturing fluid system comprising a fluid composition and a base fluid,
   a. the fluid composition comprising:
      a nano-crosslinker, wherein the nano-crosslinker comprises a nanomaterial surface modified with a crosslinker, wherein the crosslinker comprises an amine-containing crosslinker, and
      a base polymer; and
   b. the base fluid operable to suspend the fluid composition, the base fluid comprising water;
   wherein the fluid composition and the base fluid are combined to produce the fracturing fluid system, wherein the fracturing fluid system is operable to increase conductivity in the subterranean reservoir formation.

2. The fracturing fluid system of claim 1, wherein the fluid composition is thermally stable up to a temperature of 450° F.

3. The fracturing fluid system of claim 1, wherein the nanomaterial comprises a material selected from the group consisting of silica, cellulose, carbon-based materials, and combinations thereof.

4. The fracturing fluid system of claim 1, wherein the base polymer comprises an acrylamide-based polymer.

5. The fracturing fluid system of claim 1, further comprising a proppant selected from the group consisting of sand, clay, bauxite, alumina and aluminosilicates and combinations thereof.

6. The fracturing fluid system of claim 1, further comprising a pH control agent selected from the group consisting of potassium hydroxide, sodium hydroxide, acetic acid, potassium carbonate, sodium carbonate, potassium bicarbonate, sodium bicarbonate, hydrochloric acid and combinations thereof.

7. The fracturing fluid system of claim 1, further comprising an antioxidant selected from the group consisting of phenols, polyphenols, di-tertbutyl alkyl phenols, hydroquinone, apigenin, resveratrol, ascorbic acid and tocopherol, sodium thiosulfate, sodium thiosulfite, isopropanol, methanol, ethylene glycol, thiourea and combinations thereof.

8. The fracturing fluid system of claim 1, further comprising a clay stabilizer selected from the group consisting of sodium chloride, potassium chloride, ammonia chloride, tetramethylammonium chloride (TMAC), other quaternary molecules, and combinations thereof.

9. The fracturing fluid system of claim 1, wherein the fluid composition reduces a polymer loading required to stimulate the subterranean reservoir formation in a hydraulic fracturing process by at least 25%.

10. The fracturing fluid system of claim 1, wherein the fluid composition reduces a polymer loading required to stimulate the subterranean reservoir formation in a hydraulic fracturing process by at least 50%.

11. A method for increasing conductivity in a hydrocarbon producing subterranean reservoir formation, the method comprising the steps of:
   a. identifying a hydrocarbon producing subterranean reservoir formation; and
   b. introducing an effective amount of the fracturing fluid system of claim 1 into the hydrocarbon producing subterranean reservoir formation such that conductivity is increased within fractures.

12. The method of claim 11, wherein the fracturing fluid system comprises a nanomaterial selected from the group consisting of silica, cellulose, carbon-based materials, and combinations thereof.

13. The method of claim 11, wherein the fracturing fluid system is thermally stable up to a temperature of 450° F.

14. The method of claim 11, wherein the fracturing fluid system comprises an amine-containing crosslinker.

15. The method of claim 11, wherein the fracturing fluid system comprises a proppant selected from the group consisting of sand, clay, bauxite, alumina and aluminosilicates and combinations thereof.

16. The fracturing fluid system of claim 1, wherein the amine-containing crosslinker is selected from the group consisting of amines, polyamines, copolymers of amines and other monomers, or combinations thereof.

17. The fracturing fluid system of claim 1, wherein the amine-containing crosslinker is a polyamine selected from the group consisting of polyethylenimine (PEI), spermidine, spermine, polypropylenimine, poly(N-vinylimidazole), polyamines, polyamides, polyimines and polyimides.

18. A fracturing fluid system for increasing hydrocarbon production in a subterranean reservoir formation, the fracturing fluid system comprising:
   a fluid composition, the fluid composition comprising:
      a base polymer, wherein the base polymer comprises an acrylamide-based polymer, and
      a nano-crosslinker, the nano-crosslinker comprising:
         a nanomaterial, wherein the nanomaterial comprises a material selected from the group consisting of silica, cellulose, carbon-based materials and combinations thereof, and
         a crosslinker, wherein the crosslinker comprises an amine-containing crosslinker, wherein the nanomaterial is surface modified with the crosslinker; and
      a base fluid, wherein the base fluid comprises water.

19. The fracturing fluid system of claim 18, wherein the amine-containing crosslinker is selected from the group consisting of amines, polyamines, copolymers of amines and other monomers, or combinations thereof.

20. The fracturing fluid system of claim 18, wherein the amine-containing crosslinker is a polyamine selected from the group consisting of polyethylenimine (PEI), spermidine, spermine, polypropylenimine, poly(N-vinylimidazole), polyamines, polyamides, polyimines and polyimides.

* * * * *